(12) United States Patent
Kim et al.

(10) Patent No.: US 6,912,024 B2
(45) Date of Patent: Jun. 28, 2005

(54) ARRAY SUBSTRATE OF LIQUID CRYSTAL DISPLAY DEVICE HAVING THIN FILM TRANSISTOR ON COLOR FILTER STRUCTURE AND METHOD OF FABRICATING THE SAME

(75) Inventors: Se-Jun Kim, Seoul (KR); Seung-Ryul Park, Incheon-kwangyokshi (KR)

(73) Assignee: LG. Philips LCD Co., Ltd., Seoul (KR)

(*) Notice: Subject to any disclaimer, the term of this patent is extended or adjusted under 35 U.S.C. 154(b) by 36 days.

(21) Appl. No.: 10/716,562

(22) Filed: Nov. 20, 2003

(65) Prior Publication Data

US 2004/0109110 A1 Jun. 10, 2004

(30) Foreign Application Priority Data

Dec. 10, 2002 (KR) ................................ 10-2002-0078106

(51) Int. Cl.⁷ ............................................ G02F 1/1335
(52) U.S. Cl. ...................................... 349/106; 349/138
(58) Field of Search ............................... 349/106–109, 349/138

(56) References Cited

U.S. PATENT DOCUMENTS 6,191,835 B1 * 2/2001 Choi ........................... 349/106
6,407,782 B1 * 6/2002 Kim ............................ 349/106
6,429,916 B1 * 8/2002 Nakata et al. ............... 349/106

* cited by examiner

Primary Examiner—Kenneth Parker
Assistant Examiner—Phu Vu
(74) Attorney, Agent, or Firm—Morgan Lewis & Bockius

(57) ABSTRACT

An array substrate of a liquid crystal display device having a thin film transistor on a color filter structure and a method of fabricating the same are disclosed in the present invention. The liquid crystal display device having a thin film transistor on color filter structure array substrate includes a gate line and a gate electrode on a substrate, the gate line and the gate electrode being formed of a light-shielding material, a color filter layer on the substrate, covering edge portions of the gate line and the gate electrode, an overcoat layer over the substrate covering the color filter, the overcoat layer having openings exposing portions of the gate line and the gate electrode, a gate insulating layer on the overcoat layer, the color filter layer, the gate line, and the gate electrode, a semiconductor layer on the gate insulating layer, wherein the semiconductor layer has a width smaller than the gate electrode, source and drain electrodes on the gate insulating layer, contacting portions of the semiconductor layer, wherein the gate electrode, the semiconductor layer, the source electrode, and the drain electrode constitute a thin film transistor, a data line on the gate insulating layer, extending from the source electrode, crossing the gate line, and defining a pixel region, a passivation layer covering the thin film transistor and the data line and having a drain contact hole exposing a portion of the drain electrode, and a pixel electrode on the passivation layer, contacting the drain electrode through the drain contact hole.

26 Claims, 10 Drawing Sheets

ARRAY SUBSTRATE OF LIQUID CRYSTAL DISPLAY DEVICE HAVING THIN FILM TRANSISTOR ON COLOR FILTER STRUCTURE AND METHOD OF FABRICATING THE SAME This application claims the benefit of the Korean Patent Application No. P2002-078106 filed on Dec. 10, 2002, which is hereby incorporated by reference.

BACKGROUND OF THE INVENTION

1. Field of the Invention

The present invention relates to a liquid crystal display device, and more particularly, to an array substrate of a liquid crystal display device having a thin film transistor on color filter structure and a method of fabricating the same. Although the present invention is suitable for a wide scope of applications, it is particularly suitable for increasing an aperture ratio and simplifying the fabrication process.

2. Discussion of the Related Art

In general, since flat panel display devices are thin, light weight, and have a low power consumption, they have been used for portable display devices. Among the various types of flat panel display devices, liquid crystal display (LCD) devices are widely used for laptop computers and desktop computer monitors because of their superiority in resolution, color image display, and display quality.

Optical anisotropy and polarization characteristics of liquid crystal molecules are utilized to generate desirable images. Liquid crystal molecules have specific alignment directions that result from their own peculiar characteristics. The specific alignment can be modified by electric fields that are applied upon the liquid crystal molecules. In other words, the electric fields applied upon the liquid crystal molecules can change the alignment of the liquid crystal molecules. Due to the optical anisotropy, the incident light is refracted according to the alignment of the liquid crystal molecules.

Specifically, the LCD devices include upper and lower substrates having electrodes that are spaced apart and face into each other, and a liquid crystal material is interposed therebetween. Accordingly, when a voltage is applied to the liquid crystal material through the electrodes of each substrate, an alignment direction of the liquid crystal molecules is changed in accordance with the applied voltage, thereby displaying images. By controlling the applied voltage, the LCD device provides various light transmittances to display image data.

The liquid crystal display (LCD) devices are widely applied in office automation (OA) and video equipment due to their characteristics such as light weight, slim dimension, and low power consumption. Among different types of LCD devices, active matrix LCDs (AM-LCDs) having thin film transistors and pixel electrodes arranged in a matrix form provide high resolution and superiority in displaying moving images. A typical LCD panel has an upper substrate, a lower substrate, and a liquid crystal layer interposed therebetween. The upper substrate (referred to as a color filter substrate) includes a common electrode and color filters. The lower substrate (referred to as an array substrate) includes thin film transistors (TFT's) as switching elements and pixel electrodes.

As previously described, the operation of an LCD device is based on the principle that the alignment direction of liquid crystal molecules varies with the applied electric fields between the common electrode and the pixel electrode. Accordingly, the liquid crystal molecules function as an optical modulation element having variable optical characteristics that depend upon the polarity of the applied voltage.

FIG. 1 is an expanded perspective view illustrating the related art active matrix liquid crystal display device. As shown in FIG. 1, an LCD device 11 includes an upper substrate 5 (referred to as a color filter substrate) and a lower substrate 22 (referred to as an array substrate) having a liquid crystal layer 14 interposed therebetween. On the upper substrate 5, a black matrix 6 and a color filter layer 8 are formed in an array matrix including a plurality of red (R), green (G), and blue (B) color filters surrounded by corresponding portions of the black matrix 6. Additionally, a common electrode 18 is formed on the upper substrate 5 and covers the color filter layer 8 and the black matrix 6.

On the lower substrate 22, a plurality of thin film transistors T are formed in a shape of an array matrix corresponding to the color filter layer 8. A plurality of gate lines 13 and data lines 15 perpendicularly cross one another such that each TFT T is located adjacent to each intersection of the gate lines 13 and the data lines 15. Furthermore, a plurality of pixel electrodes 17 are formed on a pixel region P defined by the gate lines 13 and the data lines 15 of the lower substrate 22. The pixel electrode 17 is formed of a transparent conductive material having high transmissivity, such as indium-tin-oxide (ITO) or indium-zinc-oxide (IZO).

Still in FIG. 1, a storage capacitor $C_{ST}$ is disposed at each pixel P and connected in parallel to each pixel electrode 17. The storage capacitor $C_{ST}$ is comprised of a portion of the gate line 13 as a first capacitor electrode, a storage metal layer 30 as a second capacitor electrode, and an interposed insulator (shown as reference numeral 16 of FIG. 2). Since the storage metal layer 30 is connected to the pixel electrode 17 through a contact hole, the storage capacitor $C_{ST}$ electrically contacts the pixel electrode 17.

In the related art LCD device shown in FIG. 1, a scanning signal is applied to the gate electrode of the thin film transistor T through the gate line 13, and a data signal is applied to the source electrode of the thin film transistor T through the data line 15. As a result, the liquid crystal molecules of the liquid crystal material layer 14 are aligned and arranged by the operation of the thin film transistor T, and the incident light passing through the liquid crystal layer 14 is controlled to display an image. However, since the pixel and common electrodes 17 and 18 are positioned on the upper and lower substrates 5 and 22, respectively, the electric fields induced between the upper and lower substrates 5 and 22 are perpendicular to the surfaces of the upper and lower substrates 5 and 22.

When fabricating the LCD device 11 of FIG. 1, the upper substrate 5 is aligned with and attached to the lower substrate 22. In this process, the upper substrate 5 can be misaligned with respect to the lower substrate 22, and a light leakage occurs in the completed LCD device 11 due to an error margin in attaching the upper and lower substrates 5 and 22.

FIG. 2 is a schematic cross-sectional view taken along line II—II of FIG. 1 and illustrates a pixel of the related art liquid crystal display device.

As shown in FIG. 2, the related art LCD device includes the upper substrate 5, the lower substrate 22, and the liquid crystal layer 14. The upper and lower substrates 5 and 22 are spaced apart from each other, and the liquid crystal layer 14 is interposed therebetween. The upper and lower substrates 5 and 22 are often referred to as an array substrate and a color filter substrate, respectively, because the color filter layer 8 is formed upon the upper substrate and a plurality of array elements are formed on the lower substrate 22.

In FIG. 2, the thin film transistor T is formed on the front surface of the lower substrate 22. The thin film transistor T includes a gate electrode 32, an active layer 34, a source electrode 36, and a drain electrode 38. Between the gate electrode 32 and the active layer 34, a gate insulation layer 16 is interposed to protect the gate electrode 32 and the gate line 13. As shown in FIG. 1, the gate electrode 32 extends from the gate line 13 and the source electrode 36 extends from the data line 15. All of the gate, source, and drain electrodes 32, 36, and 38 are formed of a metallic material while the active layer 34 is formed of silicon. A passivation layer 40 is formed on the thin film transistor T for protection. In the pixel region P, the pixel electrode 17 formed of a transparent conductive material is disposed on the passivation layer 40 and contacts the drain electrode 38 and the storage metal layer 30.

Meanwhile, as mentioned above, the gate electrode 13 acts as a first electrode of the storage capacitor $C_{ST}$ and the storage metal layer 30 acts as a second electrode of the storage capacitor $C_{ST}$. Thus, the gate electrode 13 and the storage metal layer 30 constitute the storage capacitor $C_{ST}$ with the interposed gate insulation layer 16.

Still referring to FIG. 2, the upper substrate 5 is spaced apart from the lower substrate 22 over the thin film transistor T. On the rear surface of the upper substrate 5, a black matrix 6 is disposed in a position corresponding to the thin film transistor T and the gate line 13. The black matrix 6 is formed on the entire surface of the upper substrate 5 and has openings corresponding to the pixel electrode 17 of the lower substrate 22, as shown in FIG. 1. The black matrix 6 prevents a light leakage in the LCD panel except for the portion for the pixel electrode 17. The black matrix 6 protects the thin film transistor T from the light such that the black matrix 6 prevents generation of a photo-current in the thin film transistor T. The color filter layer 8 is formed on the rear surface of the upper substrate 5 to cover the black matrix 6. Each of the color filters 8 has one of the red, green, and blue colors and corresponds to one pixel region P where the pixel electrode 17 is located. A common electrode 18 formed of a transparent conductive material is disposed on the color filter layer 8 over the upper substrate 5.

In the related art LCD panel mentioned above, the pixel electrode 17 has a one-to-one relationship with one of the color filters. Furthermore, in order to prevent a cross-talk between the pixel electrode 17 and the gate and data lines 13 and 15, the pixel electrode 17 is spaced apart from the data line 15 by a distance A and from the gate line 13 by a distance B, as shown in FIG. 2. The open spaces A and B between the pixel electrode 17 and the data and gate line 15 and 13 cause a malfunction such as a light leakage in the LCD device. Namely, the light leakage mainly occurs in the open spaces A and B so that the black matrix 6 formed on the upper substrate 5 should cover the open spaces A and B. However, when the upper substrate 5 is arranged with the lower substrate 22 or vice versa, a misalignment may occur between the upper substrate 5 and the lower substrate 22. Therefore, the black matrix 6 is extended to completely cover the open spaces A and B. That is, the black matrix 6 is designed to provide an alignment margin to prevent a light leakage. However, in the case of extending the black matrix, an aperture ratio of a liquid crystal panel is reduced as much as the alignment margin of the black matrix 6. Moreover, if there are errors in the alignment margin of the black matrix 6, a light leakage still occurs in the open spaces A and B, and deteriorates the image quality of an LCD device.

To overcome the above-mentioned problem, the lower substrate of the liquid crystal display device has been researched to have a thin film transistor on color filter structure.

SUMMARY OF THE INVENTION

Accordingly, the present invention is directed to an array substrate of a liquid crystal display device having a thin film transistor on color filter structure and a method of fabricating the same that substantially obviate one or more of problems due to limitations and disadvantages of the related art.

Another object of the present invention is to provide an array substrate for a liquid crystal display device having a thin film transistor on a color filter structure, which has the thin film transistor on color filter structure to provide a high aperture ratio.

A further object of the present invention is to provide a method of fabricating an array substrate for a liquid crystal display device having a thin film transistor on a color filter structure, which simplifies the manufacturing process and increases the manufacturing yield.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device having a thin film transistor on color filter structure array substrate includes a gate line and a gate electrode on a substrate, the gate line and the gate electrode being formed of a light-shielding material, a color filter layer on the substrate, covering edge portions of the gate line and the gate electrode, an overcoat layer over the substrate covering the color filter, the overcoat layer having openings exposing portions of the gate line and the gate electrode, a gate insulating layer on the overcoat layer, the color filter layer, the gate line, and the gate electrode, a semiconductor layer on the gate insulating layer, wherein the semiconductor layer has a width smaller than the gate electrode, source and drain electrodes on the gate insulating layer, contacting portions of the semiconductor layer, wherein the gate electrode, the semiconductor layer, the source electrode, and the drain electrode constitute a thin film transistor, a data line on the gate insulating layer, extending from the source electrode, crossing the gate line, and defining a pixel region, a passivation layer covering the thin film transistor and the data line and having a drain contact hole exposing a portion of the drain electrode, and a pixel electrode on the passivation layer, contacting the drain electrode through the drain contact hole.

In another aspect of the present invention, a method of fabricating a liquid crystal display device having a thin film transistor on color filter structure array substrate includes forming a gate line and a gate electrode on a substrate using a light-shielding material, forming a color filter layer on the substrate to cover edge portions of the gate line and the gate electrode, forming an overcoat layer covering the color filter, and having openings that expose portions of the gate line and the gate electrode, forming a gate insulating layer on the overcoat layer, the color filter layer, the gate line, and the gate electrode, forming a semiconductor layer on the gate insulating layer, wherein the semiconductor layer has a width smaller than the gate electrode, forming a data line and source and drain electrodes on the gate insulating layer, the source and drain electrodes contacting portions of the semiconductor layer, wherein the gate electrode, the semiconductor layer, the source electrode, and the drain electrode constitute a thin film transistor, the data line extending from the source electrode and crossing the gate line to define a pixel region, forming a passivation layer covering the thin film transistor and the data line, the passivation layer having a drain contact hole exposing a portion of the drain electrode, and forming a pixel electrode on the passivation layer, the pixel electrode contacting the drain electrode through the drain contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
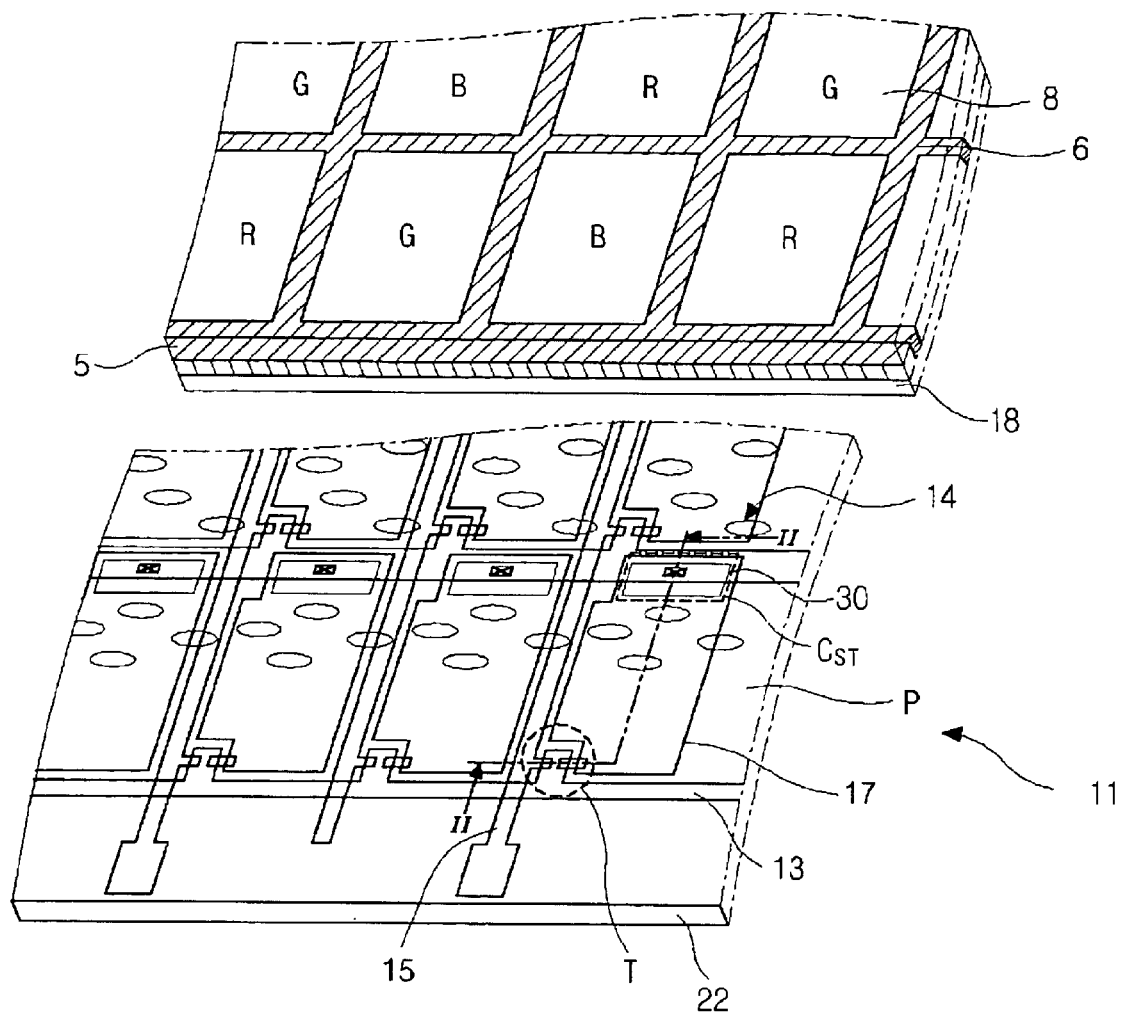
FIG. 1 is an expanded perspective view illustrating the related art liquid crystal display device.
Figure 2:
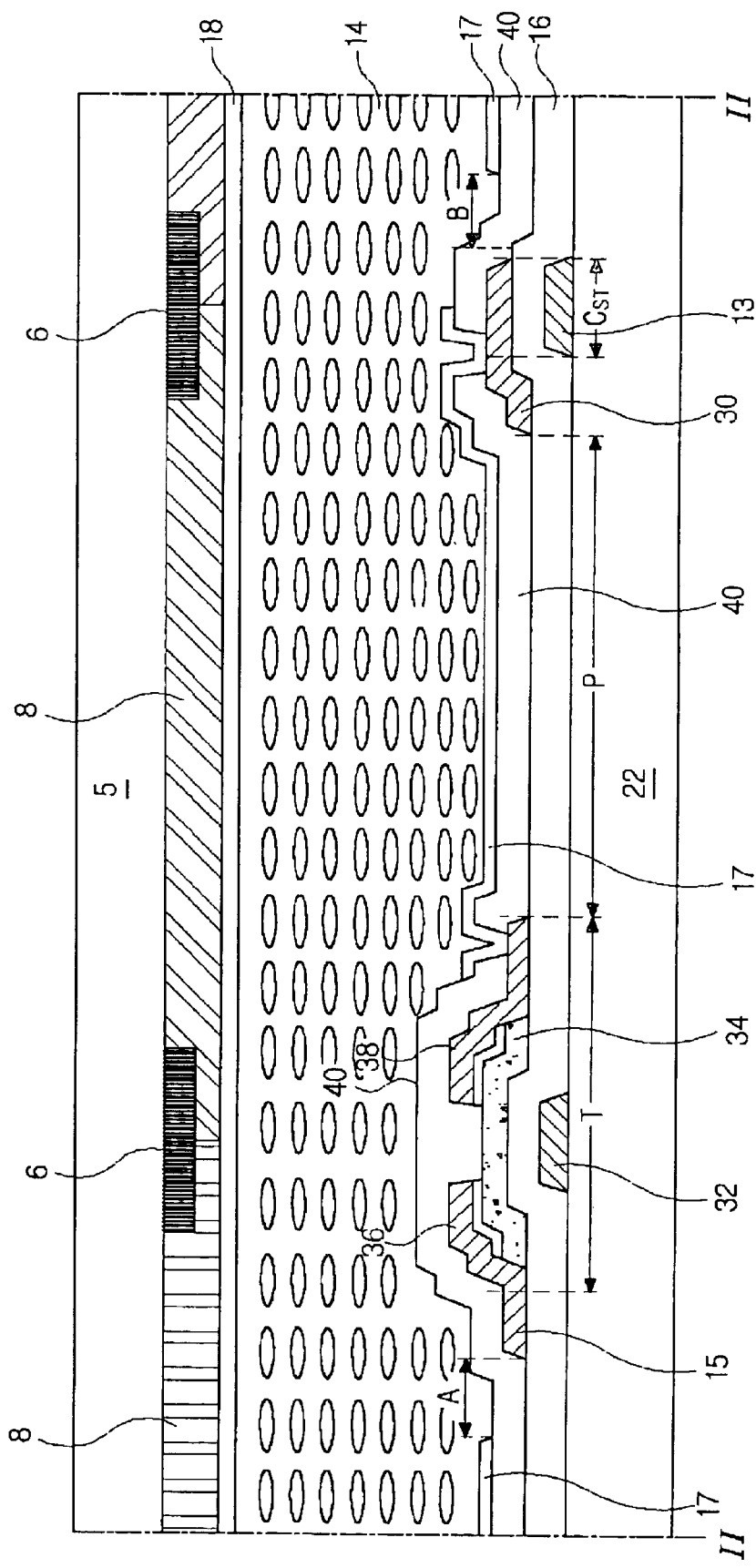
FIG. 2 is a schematic cross-sectional view taken along line II—II of FIG. 1 and illustrates a pixel of the related art liquid crystal display device.
Figure 3:
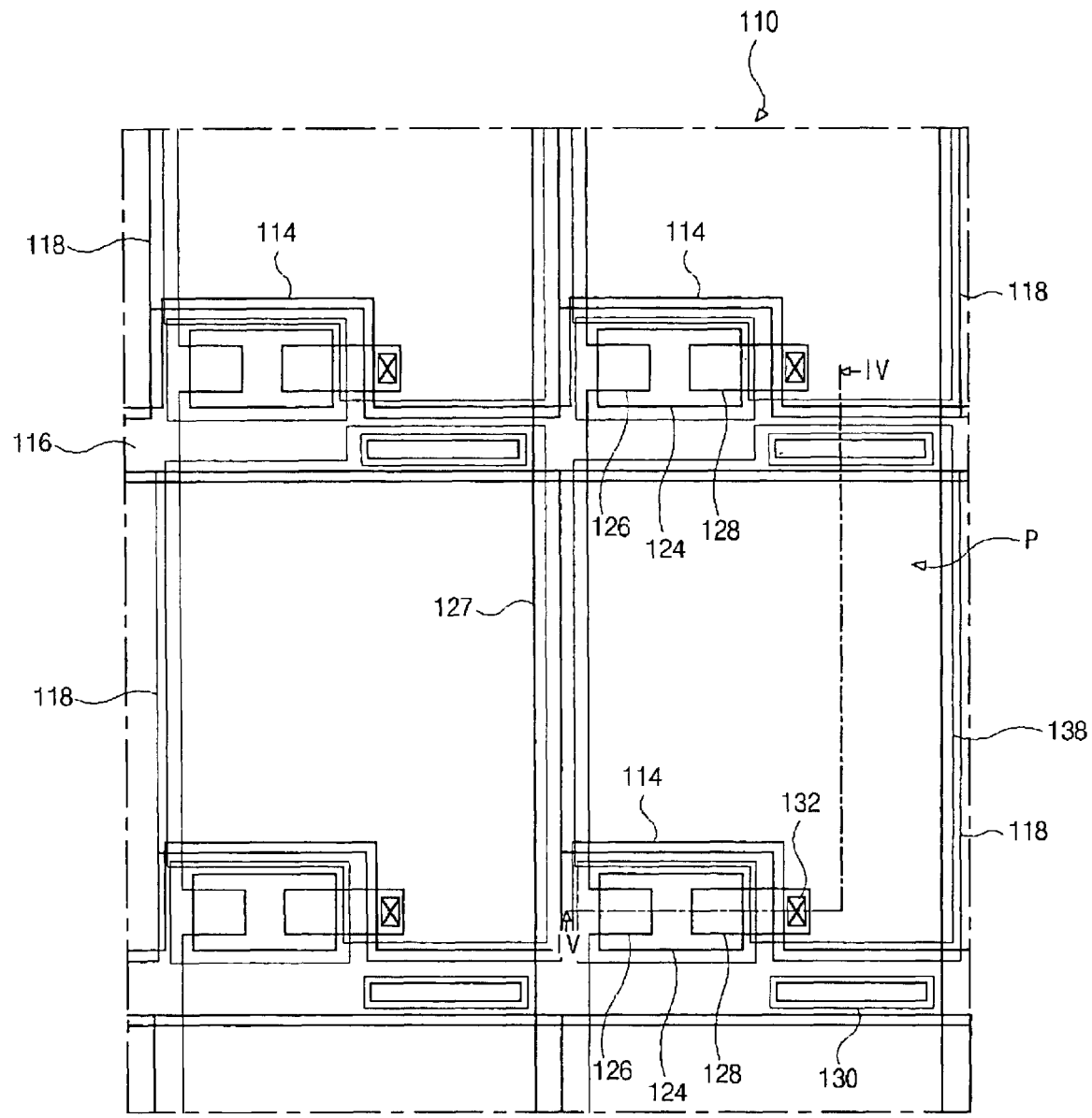
FIG. 3 is a plane view illustrating pixels of an array substrate including a thin film transistor on color filter structure (TOC) according to the present invention.

FIG. 3 is a plane view illustrating pixels of an array substrate including a thin film transistor on color filter structure (TOC) according to the present invention.

As shown in FIG. 3, an array substrate 110 includes a gate line 116 disposed in the transverse direction and a data line 127 disposed in the longitudinal direction. The gate line 116 and the data lines 127 cross each other and define a pixel region. Each of thin film transistors T is formed at each crossing portion of the gate line 116 and the data line 127. The thin film transistor T includes a gate electrode 114, an active layer 124, a source electrode 126, and a drain electrode 128.

In the pixel region defined by the gate and data lines 116 and 127, a color filter 118 is located therein. Additionally, a pixel electrode 138 is disposed corresponding to each pixel region.

Meanwhile, a storage capacitor $C_{ST}$ (shown in FIG. 4) is included in a portion of the gate line 116 and a storage metal layer 130. Thus, the portion of the gate line 116 acts as a first electrode of the storage capacitor $C_{ST}$, and the storage metal layer 130 acts as a second electrode of the storage capacitor $C_{ST}$. The pixel electrode 138 electrically contacts the storage metal layer 130, so that the pixel electrode and the storage metal layer are electrically connected to the storage capacitor $C_{ST}$ in parallel. Furthermore, the pixel electrode 138 contacts the drain electrode 128 through a drain contact hole 132.

The array substrate 110 of FIG. 3 has no black matrix because the gate line 116, the data line 127, and the gate electrode 114 are formed of an opaque metallic material and act as a black matrix. Thus, the gate line 116, the data line 127, and the gate electrode 114 prevent the incident light from passing through the array substrate and divide the color filter 118 into each pixel region.

Additionally in the present invention, since the black matrix is not disposed on and/or over the substrate, the number of process steps will decrease and the fabrication process will be simplified. Namely, the gate and data lines serve as both the signal lines applying signals and the black matrix preventing the light passage, and thus the process simplification can be achieved.

Figure 4:
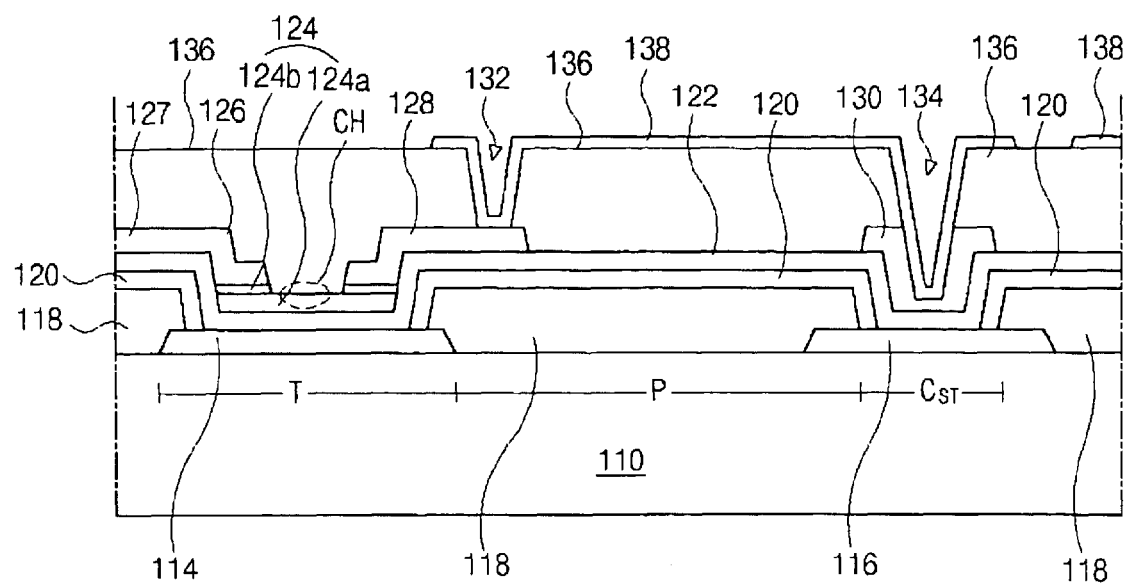
FIG. 4 is a cross-sectional view taken along line IV—IV of FIG. 3 according to the present invention.

FIG. 4 is a cross-sectional view taken along line IV—IV of FIG. 3 according to the present invention.

As shown in FIG. 4, the gate electrode 114 and the gate line 116 are formed on the substrate 110. As discussed with reference in FIG. 3, a portion of the gate line 116 functions as a first electrode of the storage capacitor. The color filter layer 118 is formed on the substrate 110 with covering the edges of the gate electrode 114 and the gate line 116. Namely, the color filter layer 118 is formed on the entire surface of the substrate 110 except for exposing portions of the gate electrode 114 and the gate line 116.

At this time, the gate electrode 114 and the gate line 116 are formed of the same material that is capable of shielding light and has a low electrical resistivity so that the gate electrode 114 and the gate line 116 acts as a black matrix. The color filter layer 118 has at least one of red, green and blue colors in each pixel region that is defined by the gate and data lines. Since the gate line 116 and the data line 127, as shown in FIG. 3, are disposed in the boundaries among color filters, the black matrix is not additionally required in the present invention.

Still referring to FIG. 4, an overcoat layer 120 is formed over the substrate 120 to cover the color filter layer 118. The overcoat layer 120 is formed of an organic material, for example, benzocyclobutene (BCB) or acrylic resin, and has openings to expose portions of the gate electrode 114 and the gate line 116. The overcoat layer 120 planarizes the surface of the substrate. A gate insulating layer 122 is formed over the entire surface of the substrate 110 to cover the overcoat layer 118. Then, a semiconductor layer 124 is disposed on the gate insulating layer 122, especially over the gate electrode 114. The semiconductor layer 124 has a smaller size than the gate electrode 114 so that it is disposed within the area of the gate electrode 114. The semiconductor layer 124 includes an active layer 124a of amorphous silicon and an ohmic contact layer 124b of doped amorphous silicon (n+ a-Si). Source and drain electrodes 126 and 128 are disposed on the gate insulating layer 122 with contacting the ohmic contact layer 124b and spaced apart from each other. A storage metal layer 130 is disposed on the gate insulating layer 122, especially over the gate line 116. The storage metal layer 130 is formed of the same material as the source and drain electrodes 126 and 128. The data line 127 is formed on the gate insulating layer 122 and connected to the source electrode 126. As shown in FIG. 3, the data line 127 crosses the gate line 116 and defines the pixel region P with the gate line 116.

The gate electrode 114, the semiconductor layer 124, the source electrode 126, and the drain electrode 128 constitute a thin film transistor T. A portion of the ohmic contact layer 124b between the source and drain electrodes 126 and 128 are eliminated to expose a portion of the underlying active layer 124a so that the exposed portion of the active layer 124a becomes a channel CH.

Still in FIG. 4, a passivation layer 136 having both a drain contact hole 132 and a capacitor contact hole 134 is disposed over the entire surface of the substrate to cover the channel CH, the data line 127, the source electrode 126, the drain electrode 128, and the storage metal layer 130. The drain contact hole 132 exposes a portion of the drain electrode 128, and the capacitor contact hole 134 exposes a portion of the storage metal layer 130. On the passivation layer 136, a pixel electrode 138 is disposed to contact both the drain electrode 128 and the storage metal layer 130 through the drain contact hole 132 and through the capacitor contact hole 134, respectively. The portion of the gate electrode 116 and the storage metal layer 130 constitute a storage capacitor $C_{ST}$ with the interposed gate insulating layer 122.

In the array substrate having the thin film transistor on color filter (TOC) structure of the present invention, since the gate patterns (i.e., the gate electrode and the gate line) serve as a black matrix, an additional process of forming the black matrix can be omitted and an aperture ratio can increase.

Furthermore, the gate patterns are formed of a light-shielding material and has a low electrical resistivity, for example, aluminum or aluminum alloy. Alternatively, the gate patterns may be formed of a double-layered structure in which a chromium layer is disposed with the underlying aluminum or aluminum alloy layer.

Figure 5:
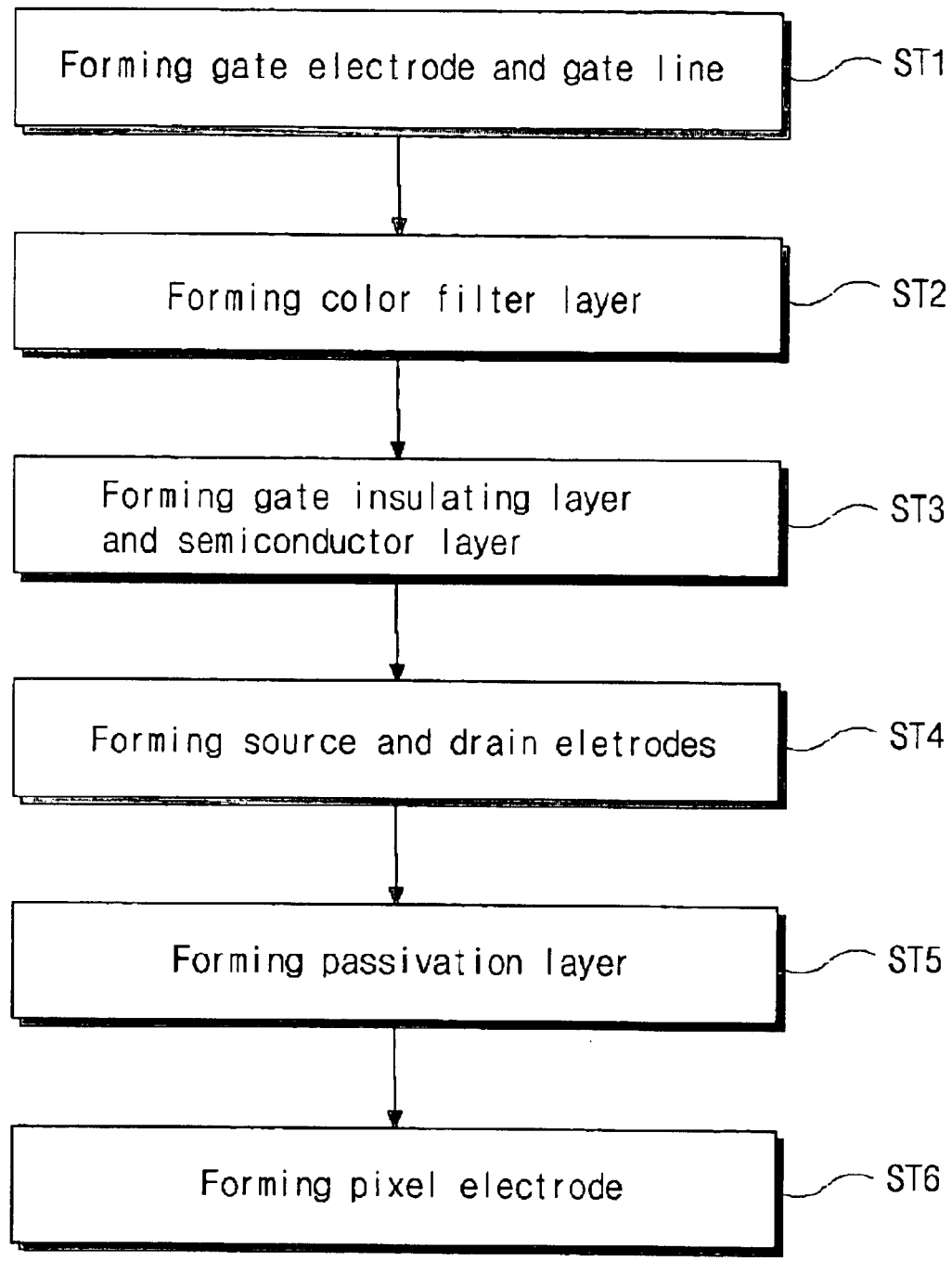
FIG. 5 is a flow chart illustrating the process steps for fabricating an array substrate having the thin film transistor on color filter (TOC) structure according to the present invention.

A fabrication process of forming the above-mentioned array substrate having a TOC structure will be explained with reference to FIGS. 5 and 6A to 6G as follows. FIG. 5 is a flow chart illustrating the process steps for fabricating an array substrate having the thin film transistor on color filter (TOC) structure according to the present invention. And FIGS. 6A to 6G are cross-sectional views taken along line IV—IV of FIG. 3, illustrating the process steps for fabricating the array substrate having the thin film transistor on color filter (TOC) structure according to the present invention.

Figure 6A:
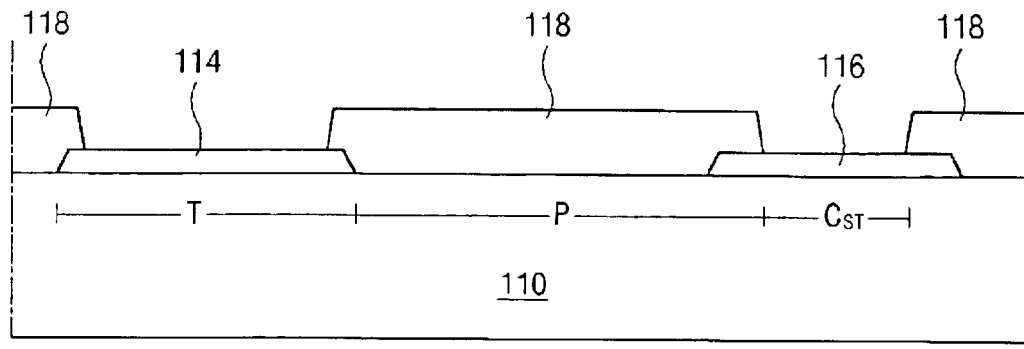
FIGS. 6A to 6G are cross-sectional views taken along line IV—IV of FIG. 3, illustrating the process steps for fabricating the array substrate having the thin film transistor on color filter (TOC) structure according to the present invention.

In ST1 of FIG. 5 and with reference to FIG. 6A, a first metal layer is formed on the substrate 110 and then patterned to form the gate electrode 114 and the gate line 116. As shown in FIG. 3, the gate electrode 114 extends from the gate line 116. Furthermore, as mentioned before, the gate electrode 114 and the gate line 116 are formed of a light-shielding material and has a low electrical resistivity, and both the gate electrode 114 and the gate line 116 can have a double-layered structure that has an aluminum lower layer and a chromium upper layer. In the present invention, as shown in FIG. 6A, since the gate patterns (i.e., the gate electrode 114 and the gate line 116) are formed of an opaque material and act as a black matrix, the fabrication process can be simplified and an aperture ratio can increase.

In ST2 of FIG. 5 and still with reference to FIG. 6A, the color filter layer 118 is formed on the substrate 110 to cover the gate electrode 114 and the gate line 116, and then the color filter layer 118 is patterned to expose portions of the gate electrode 114 and the gate line 116. Thus, the color filter layer 118 only overlaps the side edges of the gate electrode 114 and the gate line 116.

Figure 6B:
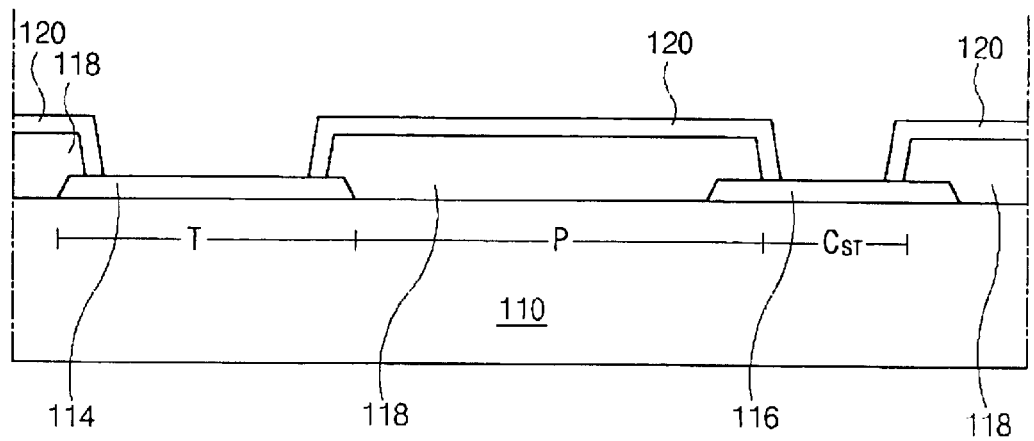

Next in FIG. 6B, the overcoat layer 120 is formed over the entire surface of the substrate 110 to cover the color filter layer 118 and the exposed gate electrode 114 and gate line 116. Then, the overcoat layer 120 is patterned to form openings that expose the gate electrode 114 and the gate line 116. The overcoat layer 120 planarizes the substrate and also protects the color filter layer 118.

Figure 6C:
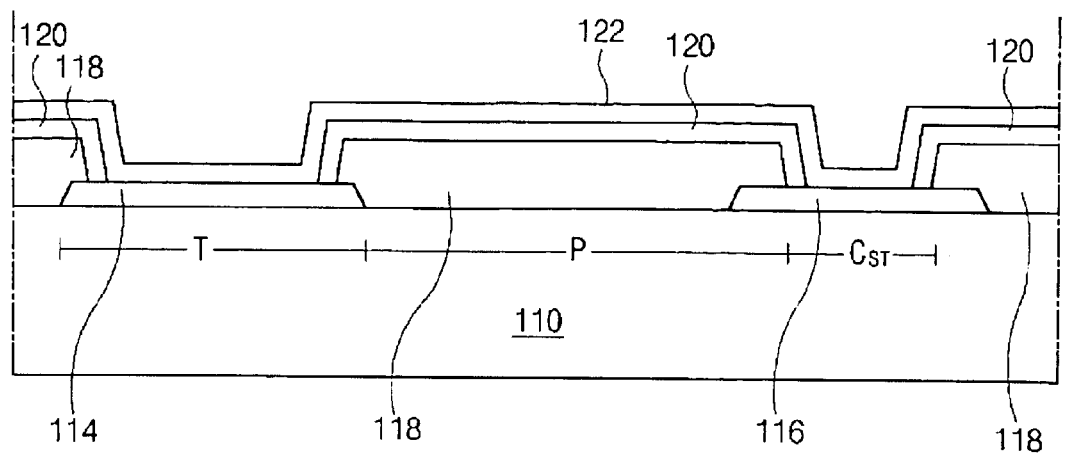

In ST3 of FIG. 5 and with reference to FIG. 6C, the gate insulating layer 122 is formed over the entire surface of the substrate 110 so that the gate insulating layer 122 covers the overcoat layer 120 and the exposed portions of the gate electrode 114 and the gate line 116. In this process, it is important that the gate insulating layer 122 fills up the openings of the overcoat layer 120.

Figure 6D:
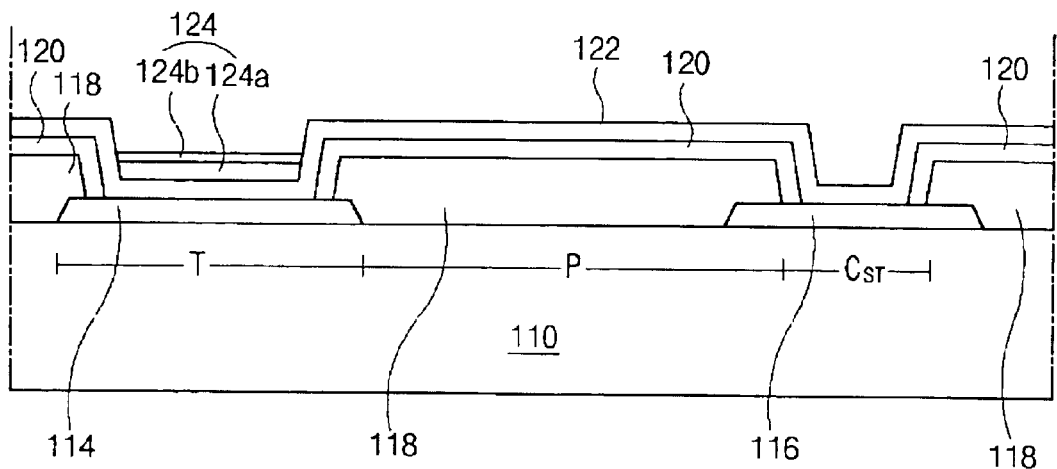

And then, as shown in FIG. 6D, the semiconductor layer 124 is formed on the gate insulating layer 122 over the gate electrode 114. The semiconductor layer 124 is not greater than the gate electrode 114 in length so that the semiconductor layer 124 is disposed within the area of the gate electrode 114. Further, the semiconductor layer 124 is formed of double-layers that include the active layer 124a in a lower position and the ohmic contact layer 124b in the upper position.

Figure 6E:
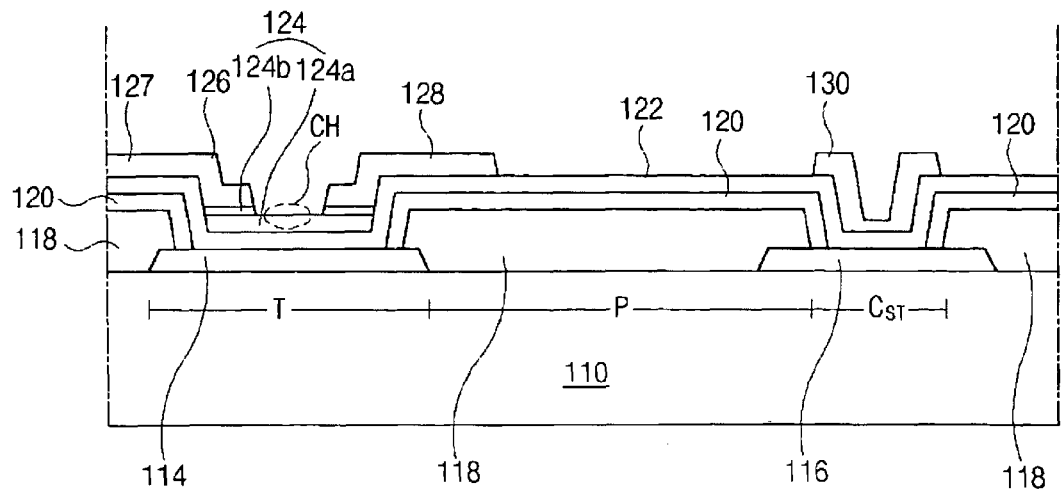

Now in ST4 of FIG. 5 and with reference to FIG. 6E, the source and drain electrode 126 and 128 contacting the ohmic contact layer 124b are formed on the gate insulating layer 122. The source and drain electrodes 126 and 128 are spaced apart from each other. When forming the source and drain electrodes 126 and 128, the data line 127 and the storage metal layer 130 are also formed on the gate insulating layer 122. The data line 127 is connected to the source electrode 126 and crosses the gate line 116, thereby defining the pixel region P. The storage metal layer 130 has an island shape electrically isolated from all of the source electrode 126, the drain electrode 128, and the data line 127, and is disposed over the gate line 116. The gate electrode 114, the semiconductor layer 124, the source electrode 126, and the drain electrode 128 constitute the thin film transistor T. Furthermore, the storage metal layer 130 and the portion of the gate line 116 form the storage capacitor $C_{ST}$ with the gate insulating layer 122 interposed between the storage metal layer 130 and the gate line 116.

Figure 6F:
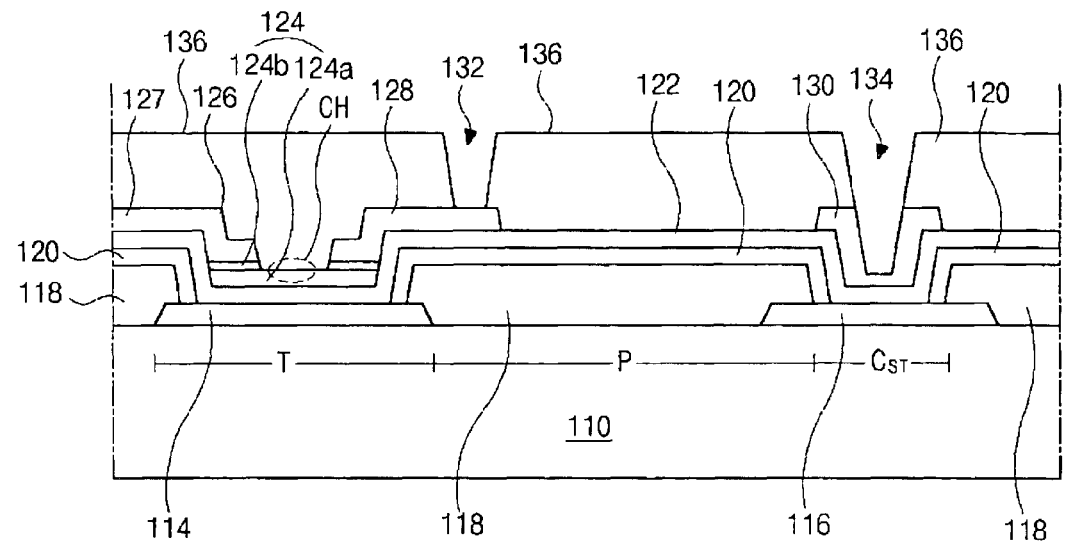

In ST5 of FIG. 5 and with reference to FIG. 6F, the passivation layer 136 is formed over the entire surface of the substrate 110 to cover the thin film transistor T, the data line 127, and the storage metal layer 130. And then, the passivation layer 136 is patterned to form both the drain contact hole 132 and the capacitor contact hole 134. The drain contact hole 132 and the capacitor contact hole 134 expose portions of the drain electrode 128 and the storage metal layer 130, respectively.

Figure 6G:
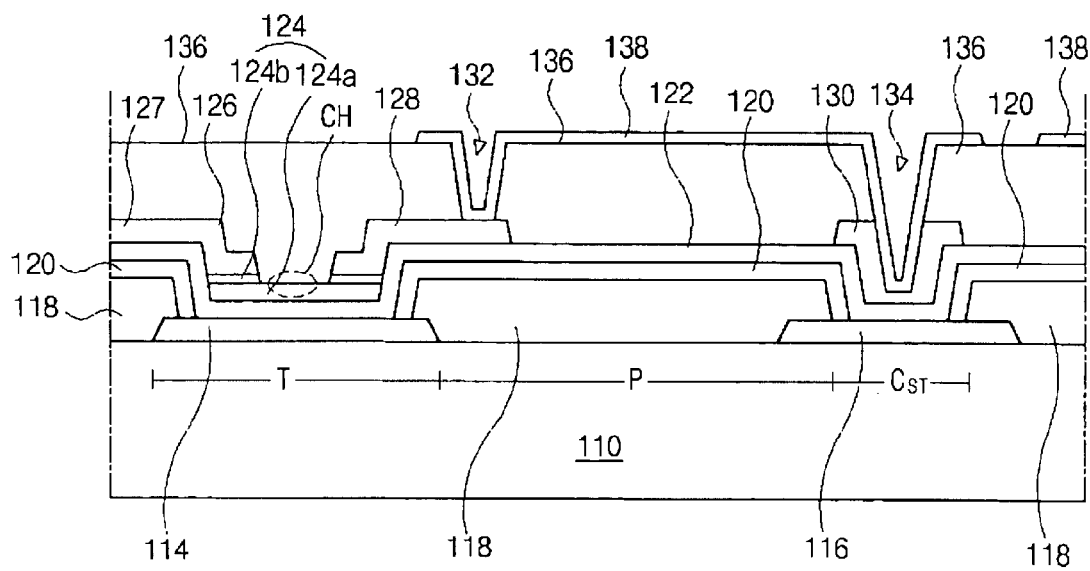

Next in ST6 of FIG. 5 and with reference to FIG. 6G, a transparent conductive material, such as indium tin oxide or indium zinc oxide, is deposited on the passivation layer 136 having the drain contact hole 132 and the capacitor contact hole 134. Thereafter, the transparent conductive material is patterned to form the pixel electrode 138 corresponding to the pixel region P. The pixel electrode 138 contacts both the drain electrode 132 and the storage metal layer 134, respectively, through the drain contact hole 132 and through the capacitor contact hole 134. Thus, the pixel electrode 138 electrically contacts both the thin film transistor T and the storage capacitor $C_{ST}$. Accordingly, the array substrate having a TOC (thin film transistor on color filter) structure is complete.

According to the present invention, the TOC structure array substrate has an opaque metal line and electrode (i.e., the gate line, the gate electrode, and the data line) as a black matrix. Therefore, in contrast to the conventional liquid crystal display structure, the black matrix is not required in the present invention, so that the fabrication process can be simplified and the production cost is reduced. Since the black matrix is not formed on and/or over the substrate, an aperture ratio of the array substrate increases. Furthermore, since the thin film transistor and the color filter layer are formed on and over the array substrate, it is not required to consider an alignment margin when designing and aligning the lower and upper substrates, thereby increasing an aperture ratio.

Figure 7:
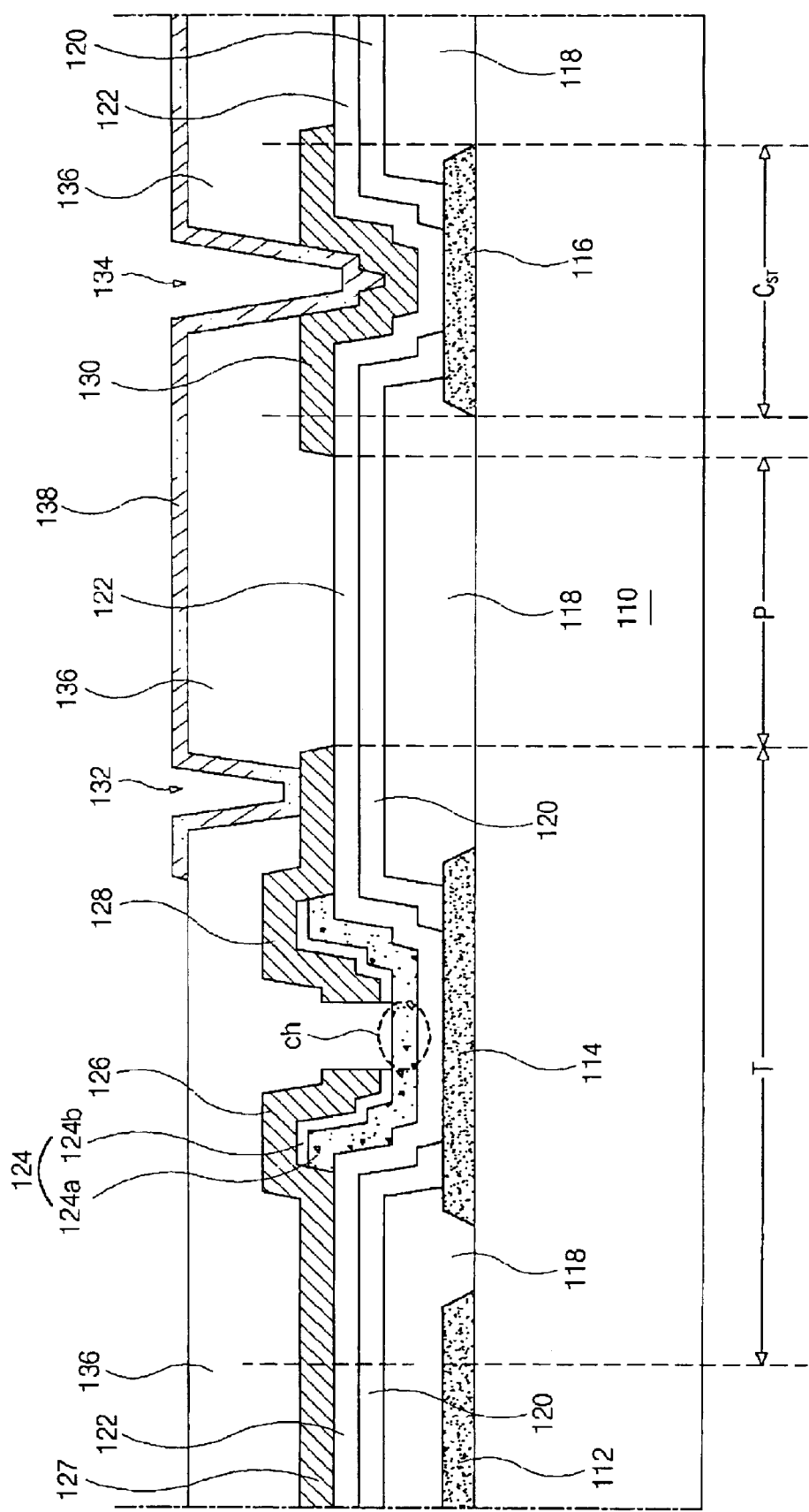
FIG. 7 is a cross-sectional view illustrating another embodiment of the present invention.

In another embodiment of the present invention, the black matrix can be formed with the gate patterns (i.e., the gate line and electrode). FIG. 7 is a cross-sectional view illustrating another embodiment of the present invention. FIG. 7 is similar to FIG. 4, except for that the array substrate of FIG. 7 has a black matrix 112 under the data line 127.

In FIG. 7, the black matrix 112 is formed when forming the gate electrode 114 and the gate line 116. The black matrix 112 is disposed under the data line 127 so that the black matrix 112 crosses the gate line 116 and defines the pixel region similar to the data line 127. Furthermore, the black matrix 112 has the same shape as the data line 127.

In this embodiment, since the black matrix is formed with the gate line, the fabrication process and the production cost can be decreased although the black matrix is formed on the lower substrate. The manufacturing yield can be increased according to the present invention.

It will be apparent to those skilled in the art that various modifications and variations can be made in the array substrate of the liquid crystal display device having a thin film transistor on a color filter structure and the method of fabricating the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display device having a thin film transistor on color filter structure array substrate, comprising:
   a gate line and a gate electrode on a substrate, the gate line and the gate electrode being formed of a light-shielding material;
   a color filter layer on the substrate, covering edge portions of the gate line and the gate electrode;
   an overcoat layer over the substrate covering the color filter, the overcoat layer having openings exposing portions of the gate line and the gate electrode;
   a gate insulating layer on the overcoat layer, the color filter layer, the gate line, and the gate electrode;
   a semiconductor layer on the gate insulating layer, wherein the semiconductor layer has a width smaller than the gate electrode;
   source and drain electrodes on the gate insulating layer, contacting portions of the semiconductor layer, wherein the gate electrode, the semiconductor layer, the source electrode, and the drain electrode constitute a thin film transistor;
   a data line on the gate insulating layer, extending from the source electrode, crossing the gate line, and defining a pixel region;
   a passivation layer covering the thin film transistor and the data line and having a drain contact hole exposing a portion of the drain electrode; and
   a pixel electrode on the passivation layer, contacting the drain electrode through the drain contact hole.

2. The device according to claim 1, wherein the light-shielding material includes one of aluminum and chromium.

3. The device according to claim 1, further comprising a storage metal layer over the gate line and between the gate insulating layer and the passivation layer.

4. The device according to claim 3, wherein the storage metal layer is formed at an opening in the overcoat layer which exposes the portion of the gate line.

5. The device according to claim 4, wherein the passivation layer has a capacitor contact hole that exposes a portion of the storage metal layer.

6. The device according to claim 5, wherein the pixel electrode contacts the storage metal layer through the capacitor contact hole.

7. The device according to claim 6, wherein the storage metal layer and the portion of the gate line constitute a storage capacitor with the gate insulating layer interposed between the storage metal layer and the gate line.

8. The device according to claim 1, wherein the overcoat layer is formed of an organic material.

9. The device according to claim 8, wherein the organic material is one of benzocyclobutene (BCB) and acrylic resin.

10. The device according to claim 1, wherein the semiconductor layer includes an active layer of amorphous silicon and an ohmic contact layer of doped amorphous silicon.

11. The device according to claim 1, wherein the color filter layer is disposed at the pixel region.

12. The device according to claim 1, further comprising a black matrix under the data line, having the same shape as the data line.

13. The device according to claim 12, wherein the black matrix is formed of the same material as the gate line and the gate electrode.

14. A method of fabricating a liquid crystal display device having a thin film transistor on color filter structure array substrate, comprising:
   forming a gate line and a gate electrode on a substrate using a light-shielding material;
   forming a color filter layer on the substrate to cover edge portions of the gate line and the gate electrode;
   forming an overcoat layer covering the color filter, and having openings that expose portions of the gate line and the gate electrode;
   forming a gate insulating layer on the overcoat layer, the color filter layer, the gate line, and the gate electrode;
   forming a semiconductor layer on the gate insulating layer, wherein the semiconductor layer has a width smaller than the gate electrode;

forming a data line and source and drain electrodes on the gate insulating layer, the source and drain electrodes contacting portions of the semiconductor layer, wherein the gate electrode, the semiconductor layer, the source electrode, and the drain electrode constitute a thin film transistor, the data line extending from the source electrode and crossing the gate line to define a pixel region;

forming a passivation layer covering the thin film transistor and the data line, the passivation layer having a drain contact hole exposing a portion of the drain electrode; and forming a pixel electrode on the passivation layer, the pixel electrode contacting the drain electrode through the drain contact hole.

15. The method according to claim 14, wherein the light-shielding material includes one of aluminum and chromium.

16. The method according to claim 14, further comprising forming a storage metal layer over the gate line and between the gate insulating layer and the passivation layer.

17. The method according to claim 16, wherein the storage metal layer is formed at an opening in the overcoat layer which exposes the portion of the gate line.

18. The method according to claim 17, wherein the passivation layer has a capacitor contact hole that exposes a portion of the storage metal layer.

19. The method according to claim 18, wherein the pixel electrode contacts the storage metal layer through the capacitor contact hole.

20. The method according to claim 19, wherein the storage metal layer and the portion of the gate line constitute a storage capacitor with the gate insulating layer interposed between the storage metal layer and the gate line.

21. The method according to claim 14, wherein the overcoat layer is formed of an organic material.

22. The method according to claim 21, wherein the organic material is one of benzocyclobutene (BCB) and acrylic resin.

23. The method according to claim 14, wherein the semiconductor layer includes an active layer of amorphous silicon and an ohmic contact layer of doped amorphous silicon.

24. The method according to claim 14, wherein the color filter layer is disposed at the pixel region.

25. The method according to claim 14, further comprising forming a black matrix under the data line, wherein the black matrix has the same shape as the data line.

26. The method according to claim 25, wherein the black matrix is formed of the same material as the gate line and the gate electrode.

* * * * *